United States Patent [19]

Lin

[11] Patent Number: 5,440,908

[45] Date of Patent: Aug. 15, 1995

[54] SECURITY DEVICE FOR A STEERING WHEEL OF AN AUTOMOBILE

[76] Inventor: Shu-Hwa Lin, No. 5, Alley 3, Lane 88, Wuchuan Rd., Shenkang Hsiang, Taichung Hsien, Taiwan

[21] Appl. No.: 279,969

[22] Filed: Jul. 25, 1994

[51] Int. Cl.⁶ ............................................. B60R 25/02
[52] U.S. Cl. ....................................... 70/209; 70/211; 70/226; 70/237
[58] Field of Search ................. 70/209, 211, 226, 237

[56] References Cited

U.S. PATENT DOCUMENTS

| | | | |
|---|---|---|---|
| 3,828,593 | 8/1974 | Bolton | 70/209 |
| 4,829,797 | 5/1989 | Wu | 70/211 |
| 5,095,723 | 3/1992 | Lin | 70/209 |
| 5,168,732 | 12/1992 | Chen et al. | 70/209 |
| 5,277,042 | 1/1994 | Tobias | 70/209 |
| 5,347,836 | 9/1994 | Chen | 70/226 |
| 5,353,615 | 10/1994 | Chen | 70/209 |

*Primary Examiner*—Peter M. Cuomo
*Assistant Examiner*—Tuyet Pham
*Attorney, Agent, or Firm*—Kirkpatrick & Lockhart

[57] ABSTRACT

A security device for a steering wheel of a vehicle includes a body having an extension portion protruding from a longitudinal direction thereof for abutting on an instrument panel, an arcuate shell mounted on an underside of the body and having an opening defined in an underside thereof for receiving the steering wheel therein, an elongated passage defined in a longitudinal direction of the body for communicating with the opening, a linking rod slidably received in the passage, a spring biased between a first end of the linking rod and a closed end of the passage, a control member for controlling the linking rod to reciprocate in the passage, a substantially L-shaped pawl member mounted in the opening and pivotally engaged with the body, the pawl member having a first stop end engaged with the linking rod and a second stop end releasably engaged with the steering wheel.

2 Claims, 5 Drawing Sheets

SECURITY DEVICE FOR A STEERING WHEEL OF AN AUTOMOBILE

BACKGROUND OF THE INVENTION

1. FIELD OF INVENTION

The present invention relates to a security device, and more particularly to a security device for a steering wheel of an automobile.

2. RELATED PRIOR ART

A conventional security device for a steering wheel of an automobile is shown in FIG. 7. However, by such an arrangement, the security device is not available for steering wheels of different sizes. In addition, the user has to rotate the lever around a large angle to lock the steering wheel, so causing a great inconvenience in operation.

There will be a more complete and sufficient illustration in the detailed description of the preferred embodiments, concerning the conventional security device.

The present invention has arisen to mitigate and/or obviate the above-mentioned disadvantages of the conventional security device for a steering wheel of an automobile.

SUMMARY OF THE INVENTION

The primary objective of the present invention is to provide a security device which is easy to be operated and is available for steering wheels of different sizes.

In accordance with one aspect of the present invention, there is provided a security device for a steering wheel of a vehicle which comprises a steering wheel and an instrument panel, the security device comprising a body having an extension portion protruding from a longitudinal direction thereof for abutting on the instrument panel, an arcuate shell mounted on an underside of the body and having an opening defined in an underside thereof for receiving the steering wheel therein, an elongated passage defined in a longitudinal direction of the body for communicating with the opening and having a closed end, a linking rod slidably received in the passage and having first end and a second end disposed outside the body, a spring biased between the first end of the linking rod and the closed end of the passage, a control member for controlling the linking rod to reciprocate in the passage, a substantially L-shaped pawl member mounted in the opening and pivotally engaged with the body, the pawl member having a first stop end engaged with the linking rod and a second stop end releasably engaged with the steering wheel, whereby, when the steering wheel is received in the opening, the linking rod is pushed to drive the pawl member to rotate and is prevented from moving backward by the control member, thereby causing the second stop end to engage with the steering wheel such that the steering wheel is locked in the opening, and when the linking rod is released by the control member, the linking rod is biased backward by the spring to rotate the pawl member in an opposite direction and is stopped by the first stop end, thereby causing the second stop end to disengage with the steering wheel such that the steering wheel is released from the opening.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 7:
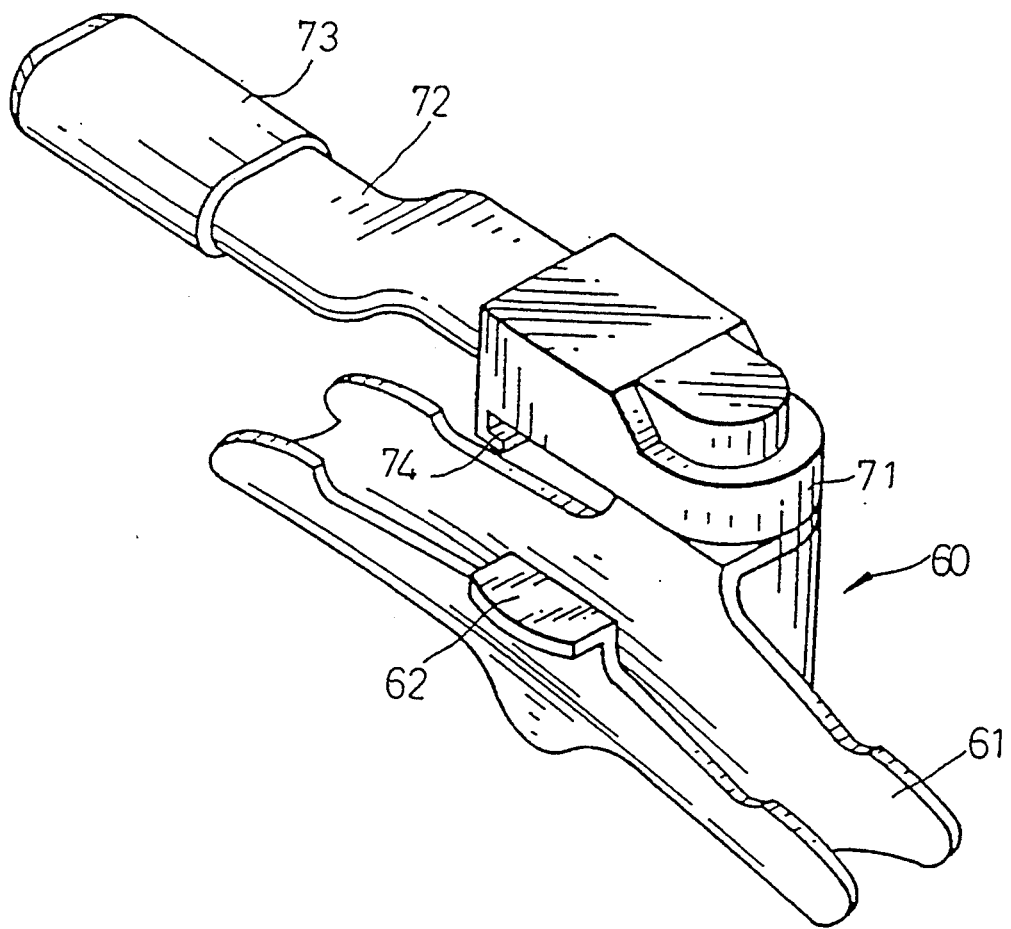
FIG. 7 is a perspective view of a conventional security device for a steering wheel of an automobile in accordance with the prior art.

For a better understanding of features and benefits of the present invention, reference is made to FIG. 7, illustrating a conventional security device in accordance with the prior art. A conventional security device for a steering wheel of an automobile comprises a base 60 having a lateral extension portion (not labeled) which has an arcuate longitudinal groove 61 defined therein and has a horizontal flange 62 formed on an upperside thereof, a locking member (not labeled) mounted in the base 60, a block 71 pivotally engaged with the base 60 and having a recess 74 defined in an underside thereof for releasable engagement with the flange 62, a lever 72 mounted to the block 71 for rotating the block 71 and having an elastomeric covering 73 mounted thereon. In operation, the steering wheel (not shown) is received in the groove 61, then the lever 72 is driven by a user to rotate the block 71 to a locking position such that the flange 62 is received in the recess 74 of the block 71, thereby locking the steering wheel between the block 71 and the groove 61 by means of the locking member in the base 60. By such an arrangement, the distance between the block 71 and a bottom face of the groove 61 is constant such that the security device is not suitable for steering wheels of different sizes. In addition, the user has to rotate the lever 72 around a large angle to lock the steering wheel, so causing a great inconvenience in operation.

Figure 1:
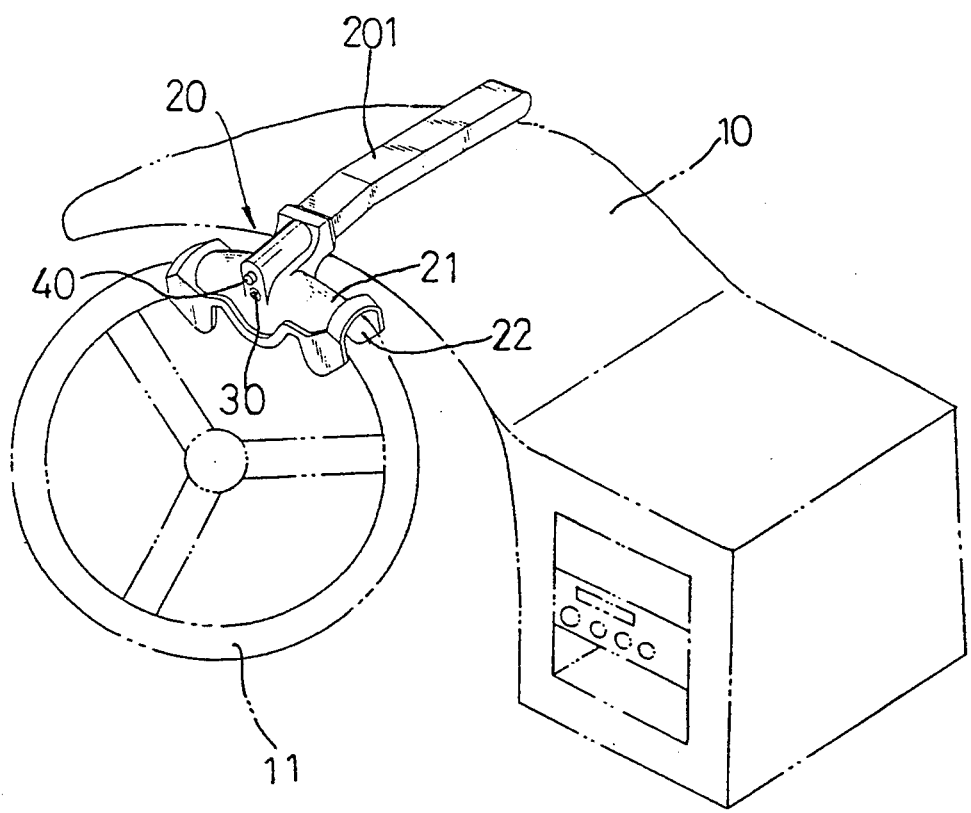
FIG. 1 is a perspective view of a security device for a steering wheel of an automobile in accordance with a first embodiment of the present invention.
Figure 2:
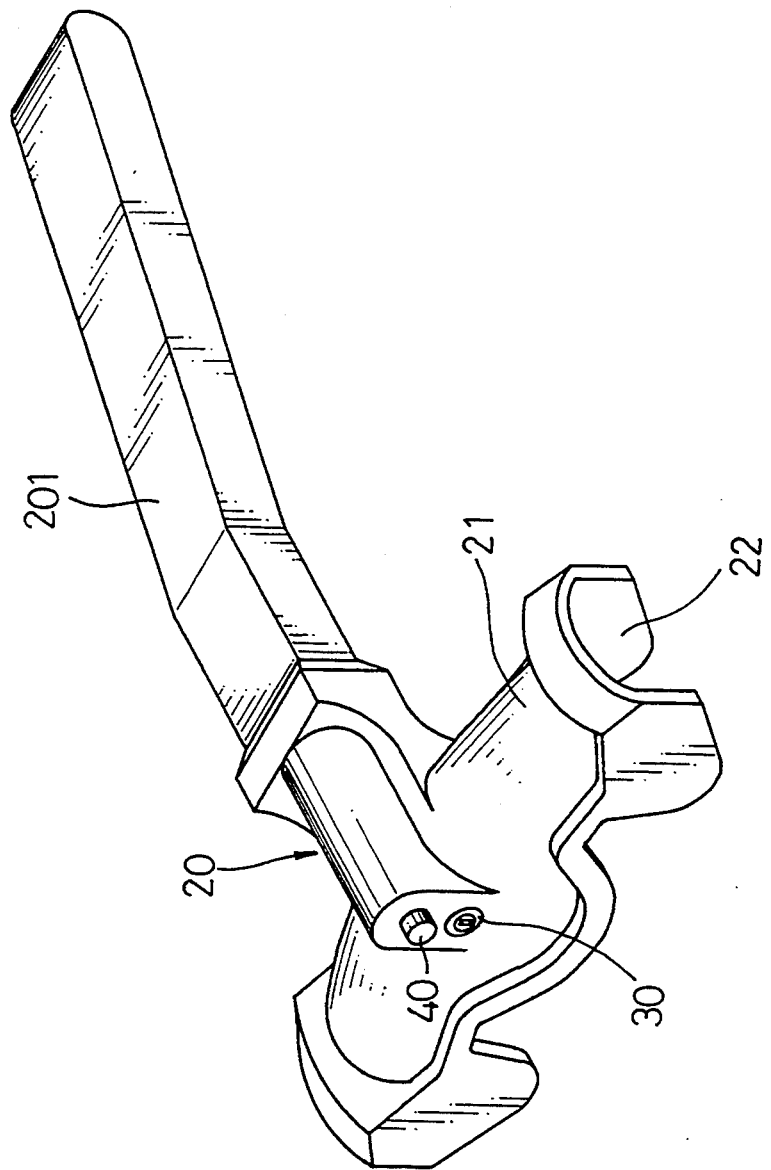
FIG. 2 is an enlarged perspective view of the security device as shown in FIG. 1.

Referring to FIGS. 1 and 2, a security device in accordance with a first embodiment of the present invention is provided for a steering wheel of an automobile which comprises a steering wheel 11 and an instrument panel 10, the security device comprising a body 20 having an extension portion 201 protruding from a longitudinal direction thereof for abutting on the instrument panel 10, an arcuate shell 21 mounted on an underside Of the body 20 and having an opening 22 defined in an underside thereof for receiving the steering wheel 11 therein.

Figure 3:
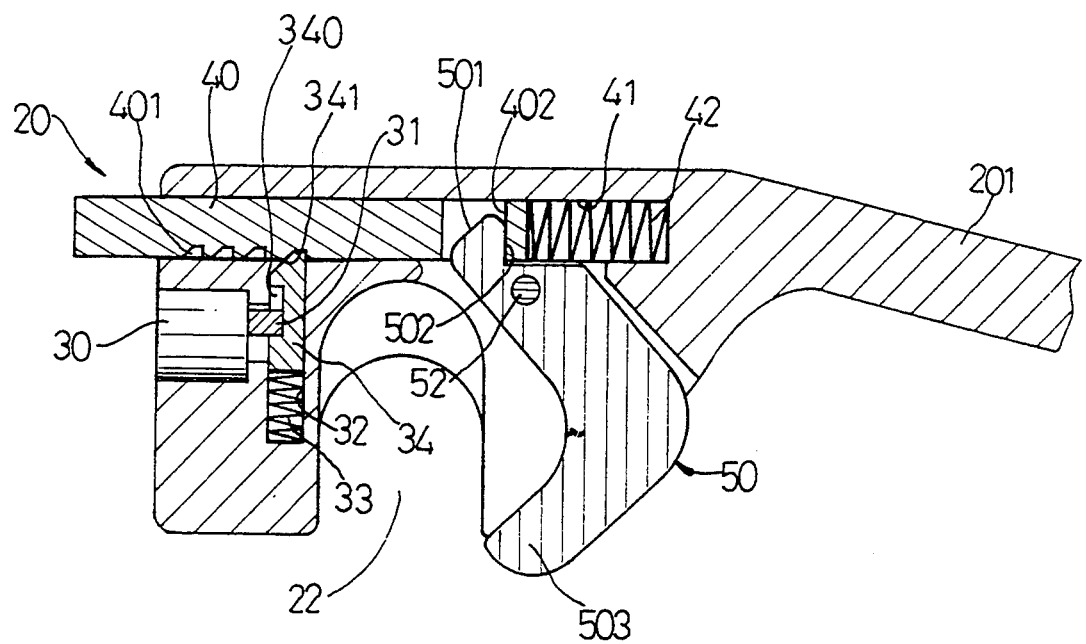
FIG. 3 is side cross-sectional view of the security device as shown in FIG. 2.
Figure 4:
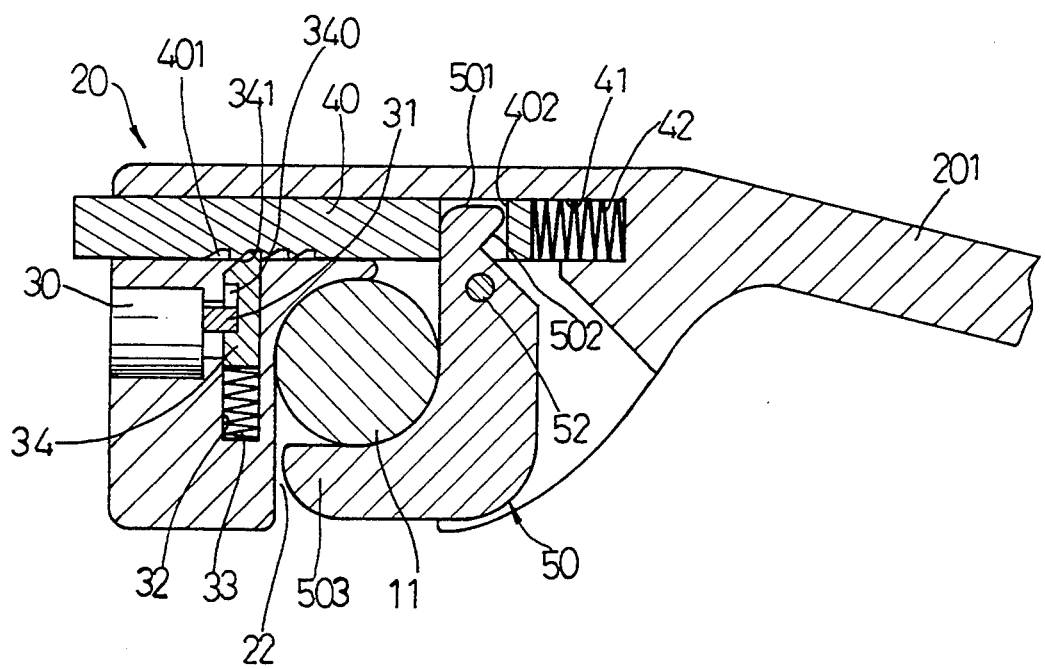
FIG. 4 is side cross-sectional operation view of the security device as shown in FIG. 3.

Referring to FIGS. 3 and 4, an elongated passage 41 is defined in a longitudinal direction of the body 20 for communicating with the opening 22 and has a closed end, a linking rod 40 slidably received in the passage 41 and having first end which has a hole 402 defined therein and a second end which is disposed outside the body 20, a spring 42 biased between the first end of the linking rod 40 and the closed end of the passage 41, a substantially L-shaped pawl member 50 mounted in the opening 22 and pivotally engaged with the body 20 about a pivot axle 52, the pawl member 50 having a first stop end 501 engaged with the linking rod 40 and a second stop end 503 releasably engaged with the steering wheel 11, the first Stop end 501 of the pawl member 50 being received in the hole 402 of the first end of the linking rod 40 and having a substantially L-shaped cavity 502 releasably engaging with the first end of the linking rod 40, whereby, when the linking rod 40 is biased backward by the spring 42, the first stop end 501 is able to stop movement of the linking rod 40 by walls defining the cavity 502.

The linking rod 40 further comprises a plurality of notches 401 defined in an underside thereof, a control member including a cylinder 30 mounted in the body 20 and having a key slot defined therein for operating with a key, an elongated compartment 32 defined in the body 20 and communicating with the passage 41, a block 34 slidably mounted in the compartment 32 and having an upper end which has a vertical section and a beveled surface 341 which faces the second end of the linking rod 40 and abuts against one of the plurality of notches 401, a spring 33 mounted in the compartment 32 and biased against the block 34, a recess 340 defined in the block 34, and a rib 31 projecting from the cylinder 30 and received in the recess 340.

In operation, referring to FIGS. 3 and 4, when the steering wheel 11 is received in the opening 22 under the arcuate shell 21, the linking rod 40 is able to be pushed by a user into the passage 4 with the plurality of notches 401 passing the beveled surface 341 of the upper end of the block 34 and is prevented from moving backward by the vertical section of the upper end of the block 34, so as to drive the first stop end 501 to rotate the pawl member 50 about the pivot axle 52, thereby causing the second stop end 503 to engage with the steering wheel 11 such that the steering wheel 11 is locked in the opening 22 (see FIG. 4). Conversely, when the cylinder 30 is rotated by the key, thereby driving the rib 31 to urge the block 34 downwardly, while the upper end of the block 34 is detached from the notch 401 of the linking rod 40 such that the linking rod 40 is released and is pushed outward by the spring 42, then stopped by the first stop end 501, thereby driving the first stop end 501 to rotate the pawl member 50 about the pivot axle 52 in an opposite direction, so causing the second stop end 503 to disengage with the steering wheel 11 such that the steering wheel 11 is released from the opening 22.

Figure 5:
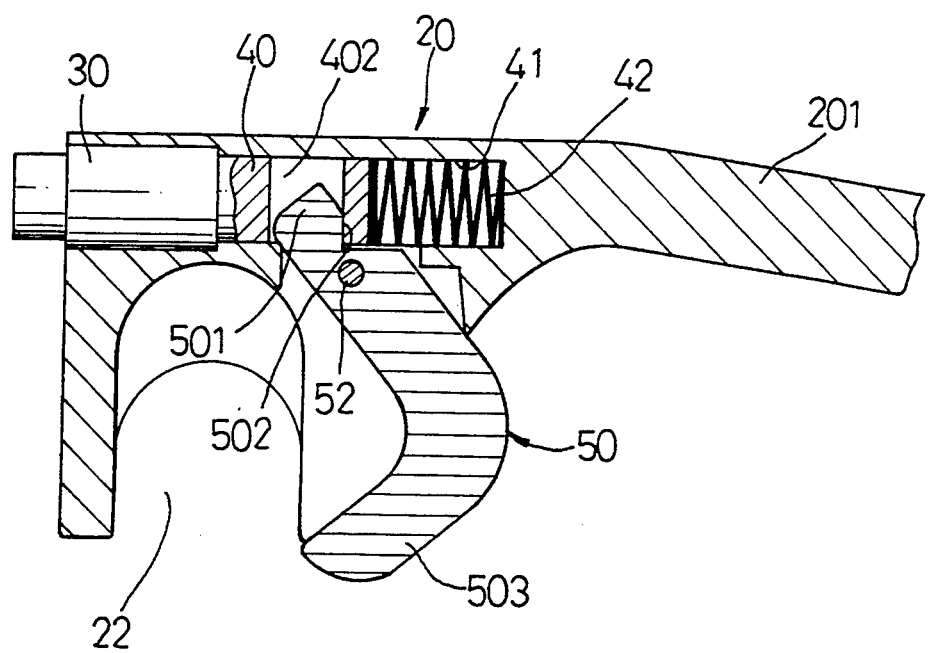
FIG. 5 is a side cross-sectional view of the security device in accordance with a second embodiment of the present invention.
Figure 6:
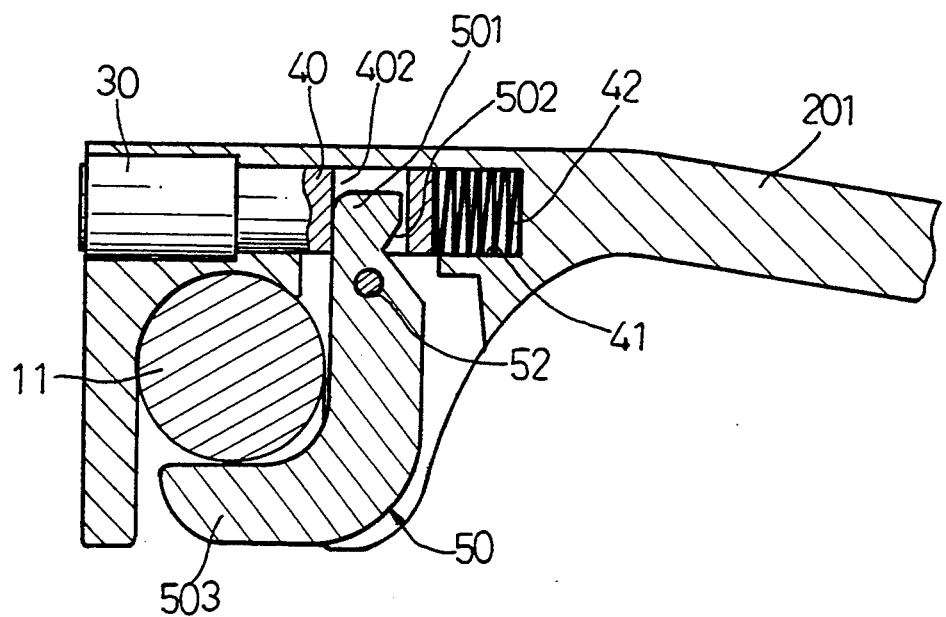
FIG. 6 is a side cross-sectional operation view as shown in FIG. 5.

Referring to FIGS. 5 and 6, in accordance with a second embodiment of the present invention, the cavity 401, block 34, spring 33, rib 31, and compartment 32 are not defined now. A cylinder 30 is mounted on the second end of the linking rod 40, a key slot is defined in the second end of the linking rod 40 for operating with a key. The linking rod 40 is longitudinally pushed into the passage 41 by a user and is prevented from moving backward by the cylinder, thereby driving the first stop end 501 to rotate the pawl member 50 to lock the steering wheel 11. Conversely, the key is rotated in the key slot to drive the cylinder 30 to release the linking rod 40, thereby again driving the first stop end 501 to rotate the pawl member 50 in an opposite direction such that the steering wheel 11 is released.

Accordingly, by such an arrangement, a security device in accordance with the present invention has the following advantages and benefits:

(1) The beveled surface of the block is able to abut against one of the notches of the linking rod such that the pawl member has a plurality of different rotating angles to lock the steering wheel such that the security device is available for steering wheels of different sizes.

(2) The locking action of the security device is easily done only with the linking rod pressed into the passage of the body, while the unlocking action is also easily achieved by simply rotating the key.

It should be clear, to those skilled in the art that further embodiments of the present invention may be made without departing from the teachings of the present invention.

I claim:

1. A security device for a steering wheel of a vehicle which comprises a steering wheel and an instrument panel, said security device comprising:

a body having an extension portion protruding from a longitudinal direction thereof for abutting on said instrument panel, an arcuate shell mounted on an underside of said body and having an opening defined in an underside thereof and facing downwardly for receiving said steering wheel therein;

an elongated passage defined in a longitudinal direction of said body and communicating with said opening and having a closed end;

a linking rod slidably received in said passage and having a first end and a second end disposed outside said body, a hole defined in the first end of said linking rod;

a spring biased between the first end of said linking rod and the closed end of said passage;

a control member for controlling said linking rod to reciprocate in said passage; and a substantially L-shaped pawl member mounted in said opening and pivotally engaged with said body, said pawl member having a first stop end, and a second stop end releasably engaged with said steering wheel, said first stop end of said pawl member being received in said hole and having a substantially L-shaped cavity defined therein, a wall defining said L-shaped cavity releasably engaging with said first end of said linking rod whereby, when said steering wheel is received in said opening said linking rod is pushed to drive said pawl member to rotate and is prevented from moving backward by said control member, thereby causing said second stop end to engage with said steering wheel such that said steering wheel is locked, in said opening and when said linking rod is released by said control member, said linking rod is biased backward by said spring to rotate said pawl member in an opposite direction thereby causing said second stop end to disengage with said steering wheel such that said steering wheel is released from said opening, and when said linking rod is biased backward by said spring, said first stop end is able to stop movement of said linking rod by said wall defining said cavity.

2. The security device in accordance with claim 1, wherein said linking rod further comprising a plurality of notches defined in an underside thereof, said control member comprises a cylinder rotatably mounted in said body and having a key slot defined therein for operating with a key, an elongated compartment vertically defined in said body and communicating with said passage, a block slidably mounted in said compartment and having a beveled surface formed on an upper end thereof, said beveled surface facing the second end of said linking rod and abutting against one of said plurality of notches, a spring mounted in said compartment and biased against said block upwardly, a recess defined in said block, and a rib projecting from said cylinder and received in said recess, whereby, said linking rod is able to be pushed into said passage through said beveled surface of the upper end of said block and is prevented from moving backward by said upper end of said block locked in one of said plurality of notches, and whereby, when said cylinder is rotated by said key, thereby driving said rib to urge said block downwardly, said upper end of said block is detached from associated said notch of said linking rod such that said linking rod is released from said upper end of said block.

* * * * *

UNITED STATES PATENT AND TRADEMARK OFFICE
CERTIFICATE OF CORRECTION

PATENT NO. : 5,440,908
DATED : August 15, 1995
INVENTOR(S) : Shu-Hwa Lin

It is certified that error appears in the above-indentified patent and that said Letters Patent is hereby corrected as shown below:

Col. 3, line 31, delete "4" and substitute therefor -- 41 --.

Signed and Sealed this

Nineteenth Day of December, 1995

Attest:

BRUCE LEHMAN

Attesting Officer      Commissioner of Patents and Trademarks